US010783466B2

(12) United States Patent
Yao et al.

(10) Patent No.: US 10,783,466 B2
(45) Date of Patent: Sep. 22, 2020

(54) INTEGRATED SYSTEM FOR OPTIMIZING VEHICLE UTILIZATION

(71) Applicant: SAP SE, Walldorf (DE)

(72) Inventors: Raymond Yao, Shanghai (CN); Xin Chen, Shanghai (CN); Philippe Nemery, Shanghai (CN)

(73) Assignee: SAP SE, Walldorf (DE)

( * ) Notice: Subject to any disclaimer, the term of this patent is extended or adjusted under 35 U.S.C. 154(b) by 983 days.

(21) Appl. No.: 15/203,955

(22) Filed: Jul. 7, 2016

(65) Prior Publication Data

US 2018/0012160 A1 Jan. 11, 2018

(51) Int. Cl.
G06Q 10/06 (2012.01)
G06Q 10/10 (2012.01)
G06Q 30/06 (2012.01)
G06Q 10/04 (2012.01)

(52) U.S. Cl.
CPC ....... *G06Q 10/06311* (2013.01); *G06Q 10/04* (2013.01); *G06Q 10/1093* (2013.01); *G06Q 30/0605* (2013.01)

(58) Field of Classification Search
CPC .............................. G06Q 10/06311
See application file for complete search history.

(56) References Cited

U.S. PATENT DOCUMENTS

| | | | | |
|---|---|---|---|---|
| 5,625,559 A | * | 4/1997 | Egawa | G05B 19/41895 |
| | | | | 701/117 |
| 8,972,185 B1 | * | 3/2015 | Viger | G01C 21/3423 |
| | | | | 701/533 |
| 2005/0216181 A1 | * | 9/2005 | Estkowski | G01C 21/20 |
| | | | | 701/411 |
| 2007/0233338 A1 | * | 10/2007 | Ariyur | G05D 1/0274 |
| | | | | 701/23 |
| 2009/0043486 A1 | * | 2/2009 | Yang | G01C 21/3492 |
| | | | | 701/117 |

(Continued)

OTHER PUBLICATIONS

Fatih Kilic and Mustafa Gok, A Public Transit Network RouteGeneration Algorithm, 1st IFAC Workshop on Advances in Control and Automation Theory for Transportation Applications Sep. 16-17, 2013.*

(Continued)

*Primary Examiner* — Andre D Boyce
(74) *Attorney, Agent, or Firm* — Fish & Richardson P.C.

(57) ABSTRACT

Various embodiments of systems and methods for optimizing vehicle utilization are described herein. The method includes determining demand, supply, and availability of vehicles. A graph with nodes (representing source and destination stations of orders) and arcs connecting nodes is generated based on validity conditions, e.g., there is network connectivity from source to destination node, etc. The arc is assigned for repositioning, waiting, and loaded move based upon input such as tolerable delay for orders, waiting cost at stations, repositioning cost, long stand cost, revenue generated from orders, order priority, etc. A network flow solver is successively executed to solve the graph to maximize profit, optimized utilization of vehicles, fulfill order on time, and balance demand and supply. Output tables including key performance indicators (KPIs) and information of fulfilled and unfulfilled orders are generated. Vehicle allocation, repositioning, waiting, and loaded move may in turn are optimized based on the output tables.

20 Claims, 11 Drawing Sheets

(56) References Cited

U.S. PATENT DOCUMENTS

| | | | |
|---|---|---|---|
| 2010/0299177 A1* | 11/2010 | Buczkowski | G06Q 10/06 |
| | | | 705/7.13 |
| 2011/0112759 A1* | 5/2011 | Bast | G01C 21/3423 |
| | | | 701/533 |
| 2016/0048802 A1* | 2/2016 | Luwang | G06Q 10/08355 |
| | | | 705/338 |
| 2017/0300049 A1* | 10/2017 | Seally | G06Q 10/047 |

* cited by examiner

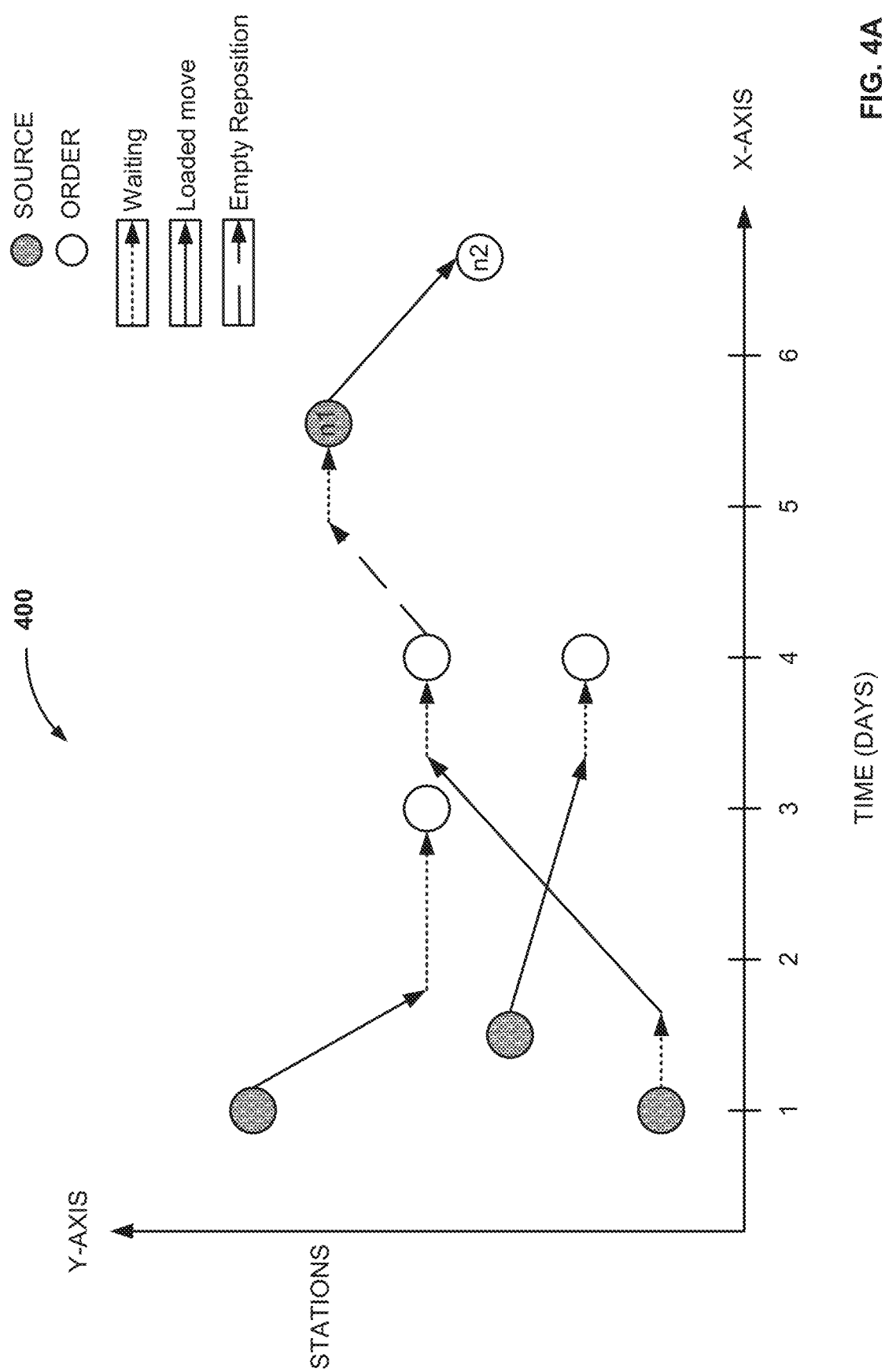

ORDER_TABLE 610

| ORDER_ID | SOURCE | ORDER | START | DUR (HRS) | DEMAND | REV 1 | REV 2 | REV 3 | WCOSTH RES (DAYS) | WCOSTH RESA | WCOSTH RESB | WCOSTH RESD (DAYS) | WCOSTH RESDA | WCOSTH RESDB | MODEL | PRIORITY |
|---|---|---|---|---|---|---|---|---|---|---|---|---|---|---|---|---|
| 001 | A | B | 12/30/2000 | 12 | 5 | $500 | $450 | $350 | 7 | $50 | $30 | 7 | $50 | $30 | PQR | HIGH(1) |

↙ 670

NETWORK_TABLE 620

| FROM | TO | TIME (HRS) | TRANSCOST ($) |
|---|---|---|---|
| A | B | 12 | 70 |

↙ 674

COMPATIBILITY_TABLE 630

| MODEL | REPLACEMENT_MODELS |
|---|---|
| PQR | XYZ, MNO |

↙ 676

SOURCE_TABLE 640

| STATION_ID | AV_DATE | SUPPLY | WCOSTTHRES | WCOSTTHRESA | WCOSTTHRESB | MODELS |
|---|---|---|---|---|---|---|
| A | 1/1/2001 | 4 | 7 | $50 | $30 | PQR, MNO, STU, XYZ |

RESULT_TABLE 650

| ORDER_ID | PRIORITY | SOURCE EST | AVDATE | EXEDATR EPO | REPO DUR | OR STATION | ORDE STINA TION | ORST DAT | ACSTD AT | DUR | MODEL | SUPPLY MODEL | ODER DEMAND | QTY | COST | REV | PROFIT |
|---|---|---|---|---|---|---|---|---|---|---|---|---|---|---|---|---|---|
| 001 | HIGH(1) | A | 1/1/2001 | 12/30/2000 | 12 HRS | A | B | 12/30/2000 | 1/1/2001 | 15 HRS | PQR | MNO | 1000 | 1000 | $50 | $500 | $450 |

← 680

KPI_TABLE 660

| PROFIT | FULFILLED | FULFILLRATE1 | FULFILLRATE2 | FULFILLRATE3 | FULFILLRATE4 | REUSE |
|---|---|---|---|---|---|---|
| $4450 | .5 | 1 | 1 | 1 | .5 | .5 |

INTEGRATED SYSTEM FOR OPTIMIZING VEHICLE UTILIZATION

BACKGROUND

Vehicles such as freight railroads play a vital role in the economy of a country. For example, vehicles may be used to transport tons of cargos to various corners of the country. Managing the vehicles for optimum utilization is a critical planning task. Often, vehicles are improperly utilized, e.g., some vehicles may be under-loaded or empty while other vehicles may be over-loaded. The improper utilization of vehicles may result in late delivery of some orders and customers' dissatisfaction. Planning proper or optimum vehicle utilization is a time consuming and difficult task.

BRIEF DESCRIPTION OF THE DRAWINGS

The embodiments are illustrated by way of examples and not by way of limitation in the figures of the accompanying drawings in which like references indicate similar elements. The embodiments may be best understood from the following detailed description taken in conjunction with the accompanying drawings.

FIGS. 4A-4B illustrate assignment of vehicles for waiting period, empty repositioning, and loaded move, according to an embodiment.

FIGS. 6A-6B illustrate an exemplary use case of network flow solver, according to an embodiment.

DESCRIPTION

Figure 1:
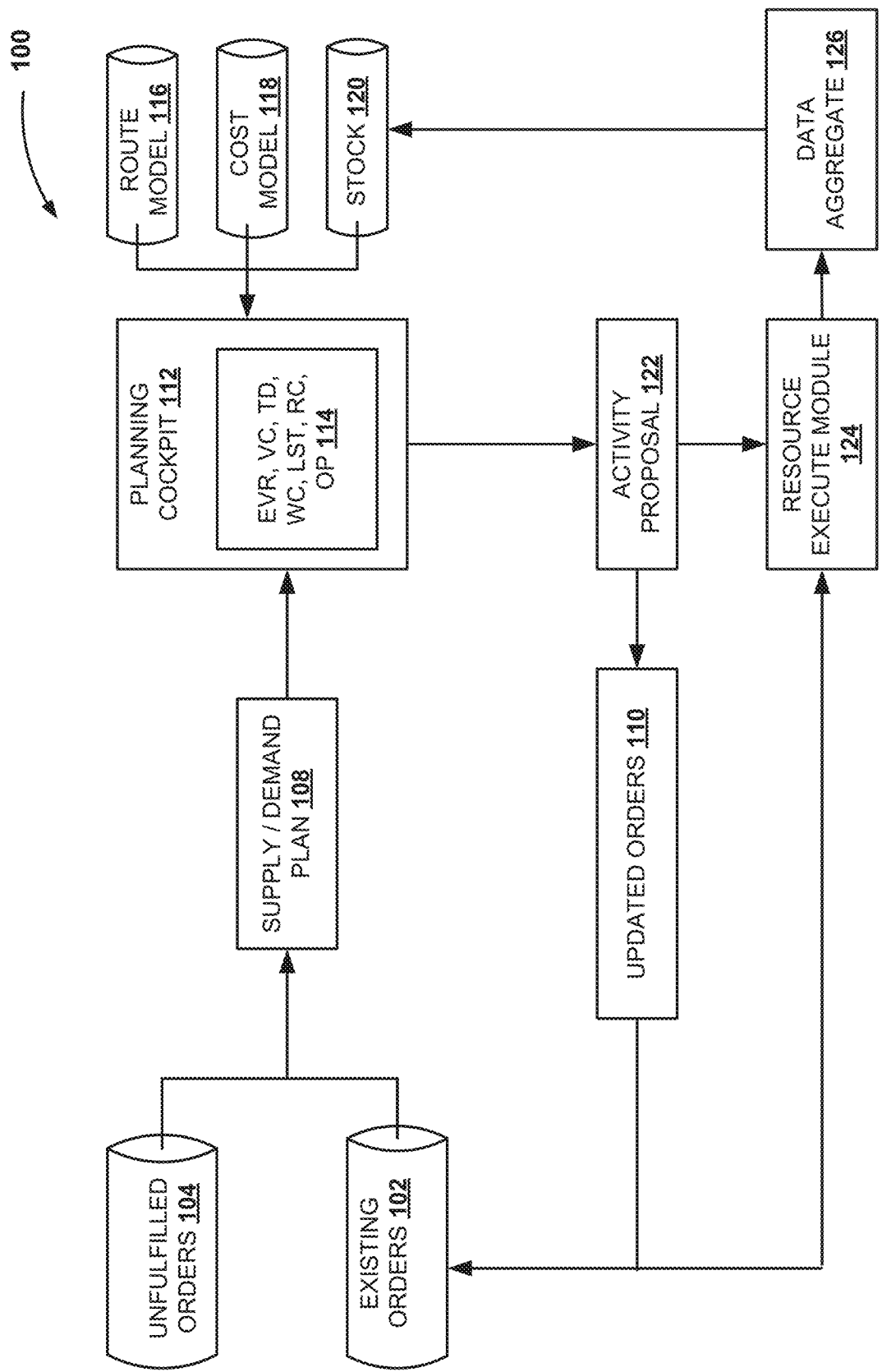
FIG. 1 is a block diagram illustrating architecture of various components of an integrated system for optimizing vehicle utilization, according to an embodiment.

Embodiments of techniques for optimizing vehicle utilization described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

"Vehicle" refers to a mobile machine to transport goods or cargo. The vehicle includes, but is not limited to, an aircraft (e.g., an airplane), a watercraft (e.g., a ship), a spacecraft (e.g., a rocket), and a land craft (e.g., a railcar). Different types of vehicle may be used for transporting different types of cargo. In an embodiment, a vehicle such as a railcar may have different types of wagon for transporting different types of cargo. The type of vehicle or wagon may be assigned automatically based upon a type of order (cargo) that is to be delivered. For example, when the order includes delicate products like flowers, fruits, eatables, etc., it may be carried through light-weight and air conditioned vehicle or wagon whereas when the order includes heavy products such as machines, it may be carried through a big sized, robust, and heavy load carrying vehicle or wagon. Based upon the order, the type of vehicle for carrying that order is assigned. In an embodiment, a user (e.g., a customer) may select or specify the type of vehicle they prefer for delivering their order. Each vehicle or wagon may have unique identifier (ID) such as 1001, 1002, 1024, etc. Some vehicles or wagons are compatible and can be used as a replacement (alternative) for other vehicles or wagons.

"Vehicle compatibility" refers to state where one vehicle or wagon can be used in place of another, e.g., as a replacement or an alternate vehicle or wagon. There may be a compatibility rule or test which has to be met before a vehicle or wagon can be used as an alternative vehicle or wagon. The compatibility rule or test may be predefined. There may be various parameters or criteria's that may be checked or required to be met for vehicle compatibility. Once a vehicle meets the compatibility rule or test with other vehicle, the vehicle may be provided as an alternative or replacement vehicle. For example, if vehicle1 (ID: 1001) meets compatibility test with vehicle2 (ID: 1024) then vehicle1 may be used as a replacement vehicle for vehicle2. In one embodiment, an in-memory database table may be provided that stores compatibility data of the vehicles.

"Transportation cost" refers to an expense involved in moving a vehicle from one place to another. For example, the expense for moving the vehicle from one station or location to another. The transportation cost may involve or include fuel cost, toll gate payment, etc.

"Waiting" cost refers to a parking fee or an expense for standing a vehicle at a location or a station. The vehicle may be loaded (e.g., with cargo) or it may be empty. The waiting cost may be calculated based upon number of hours or days a vehicle stands at the location or station. For example, the waiting cost may be free for 1 hour to 7 hours or 1 day to 7 days and may be $100 from 8th hour to 14th hour.—The waiting cost may be of two categories: (i) stand before empty repositioning cost (SBERC) or stand after order cost which is waiting cost when a vehicle stands at a source location of an empty trip or destination location of the previous loaded/order movement; and (ii) stand after empty repositioning cost (SAERC) or stand before order cost which is waiting cost when the vehicle stands at a destination of an empty trip or a source location of a customer order before delivering the order. The waiting cost computation depends upon, but not limited to, the stand before ER cost, the stand after ER cost, and waiting time (in days or hours, etc.).

"Long stand cost" refers to expense for standing or parking vehicle at a station for a substantial long time. The substantial time may be defined based on predefined threshold. When waiting time is longer than the predefined threshold, it is referred as long stand and the waiting cost then referred as long stand cost or long stand cost penalty. Typically, the long stand cost is a type of long waiting cost. Long stand cost may be much higher compared to waiting cost.

"Operational cost" refers to combination of transportation cost, waiting cost, and long stand cost. In an embodiment, waiting cost and long stand cost may together be referred as storage cost. Therefore, the operational cost is a combination of transportation cost and storage cost.

"Repositioning" cost refers to expense for moving an empty vehicle from one position, location, or station to another so that it can be utilized efficiently to fulfill or deliver order. Therefore, repositioning helps in increasing order fulfillment rate. The repositioning cost may include transportation cost. As empty reposition does not generate revenue, therefore, empty repositioning cost is required to be minimized.

"Source location" or "source station" refers to a location from where the vehicle starts or restarts for dispatching orders, e.g., a rail station near an outlet or retail shop.

"Destination location" or "destination station" refers to a location where an order is required to be dispatched or delivered, e.g., a rail station near a location of a customer. In an embodiment, the destination location may be termed as an order location.

"Fulfilled order" refers to an order which is successfully delivered or which may be canceled by the customers.

"Unfulfilled order" refers to an order which could not be delivered.

"Tolerable delay" refers to an admissible, manageable, or bearable delay in delivery of cargo or order. Orders are generally required to be delivered on time, however, if the vehicle or empty vehicle cannot arrive the source station on time, there may be delay in delivering the order to the destination station. A period of delay should be tolerable. Delay causes reduce or loss in revenue generated from the orders. The tolerable delay may be predefined, e.g., by a user such as a customer or a planner. In an embodiment, based upon the maximum loss that can be suffered, the tolerable delay may be predefined. For example, the maximum tolerable delay may be defined as three days or three hours.

"Key performance indicator" or KPI refers to a metric used to evaluate factors which are crucial to the success of an organization. For example, factors crucial to the success of a railcar company to balance supply and demand of goods and vehicles to fulfill customers' orders. Some examples of the KPIs may be waiting cost, long stand cost, transportation cost, repositioning cost, utilization of resources (vehicles), customers' order fulfillment rate, revenue generated from orders, etc. Some KPIs such as waiting cost and long stand cost may result in delay in order delivery and negatively affects revenue generation (profit), therefore, the value for these KPIs are desired to be minimized or low, while values for some KPIs such as utilization of resources, customers' order fulfillment rate, and revenue generated from orders are desired to be high. The value for these KPIs may be monitored in real time or at a predefined time interval.

"In-memory" database refers to a database that relies on main memory for computer data storage. In some examples, the in-memory database includes a combination of main memory and disk storage. Also, the in-memory database may support real-time analytics and transactional processing including replication and aggregation techniques. Also, within the in-memory database environment, calculation logic is pushed down into the database layer (as opposed to residing in the application layer) such that the processing time for querying and manipulating the data within the database may be reduced as compared with conventional relational database. In some examples, the in-memory database may be HANA® Enterprise 1.0 (or any other versions). However, the techniques described herein may be applied to any type of relational database as well.

FIG. 1 is a block diagram illustrating exemplary system 100 for optimizing vehicle utilization, according to an embodiment. A vehicle may be required to fulfill or deliver orders placed or booked by customers. The details of existing or currently pending or currently placed orders are maintained in existing orders 102. In an embodiment, the existing orders 102 may include a database table which includes details of the existing orders. The details may include a unique order identifier or ID that may be automatically generated and assigned to each order, source station (e.g., location of retail outlet where the order is placed), destination or order station (e.g., location where the order is to be delivered), priority of order or delivery (e.g., high, low, medium), quantity of each products included in the order, time of order, etc. Unfulfilled orders, which are still not delivered, are maintained in unfulfilled orders 104. Unfulfilled orders 104 includes details of the orders which may be attempted but could not be delivered successfully. Based on the existing orders 102 and the unfulfilled orders 104, the supply and demand of vehicles may be predicted as supply/demand plan 108. Modifications or changes to currently pending or existing orders are managed in updated orders 110.

Planning cockpit 112 is a software component to help reposition empty vehicles and balance the supply and demand of vehicles to optimize vehicle utilization. The planning cockpit 112 includes empty vehicle repositioning (EVR), vehicle compatibility (VC), tolerable delay (TD), waiting cost (WC), repositioning cost (RC), long stand cost (LST), order priority (OP), etc. The EVR, VC, TD, WC, RC, LST, and OP 114 are integrated and collaborated in the planning cockpit 112. With the consideration of EVR, VC, TD, WC, LST, RC, and OP 114 and supply/demand plan 108 (i.e., considering existing orders 102 and unfulfilled orders 104) an empty vehicle may be brought to a location where the next customer order can be processed. Based on the origin and destination, route model 116 generates route for the movement of vehicle. Cost model 118 is used to perform various cost calculations such as waiting cost, long stand cost, transportation cost, and repositioning cost, etc., related to the transport. Stock 120 denotes an exemplary stock of available vehicles. In an embodiment, the planning cockpit 112 integrates supply/demand plan 108, EVR, VC, TD, WC, LST, RC, and OP 114, route model 116, cost model 118, and stock 120 to determine and plan the EVR and utilize or assign vehicles optimally for different orders. Activity proposal 122 is generated based on the supply and demand plan provided to the planning cockpit 112. The activity proposal 122 may include scheduled vehicle movement, working hours of employees, etc. Resource execute module 124 enables calculation of supply/demand plan based on the existing resources and scheduled vehicle movement. Therefore, the resource execute module 124 may generate actual supply/demand plan based upon predicted supply/demand plan (by supply demand plan 108) and existing orders. Resources are aggregated using data aggregate 126. For example, the vehicle (resources) may be aggregated to determine the number of unused vehicles, reused vehicles, etc. In an embodiment, based upon aggregated vehicles data (e.g., unused vehicles), the stock 120 may be updated.

Figure 2:
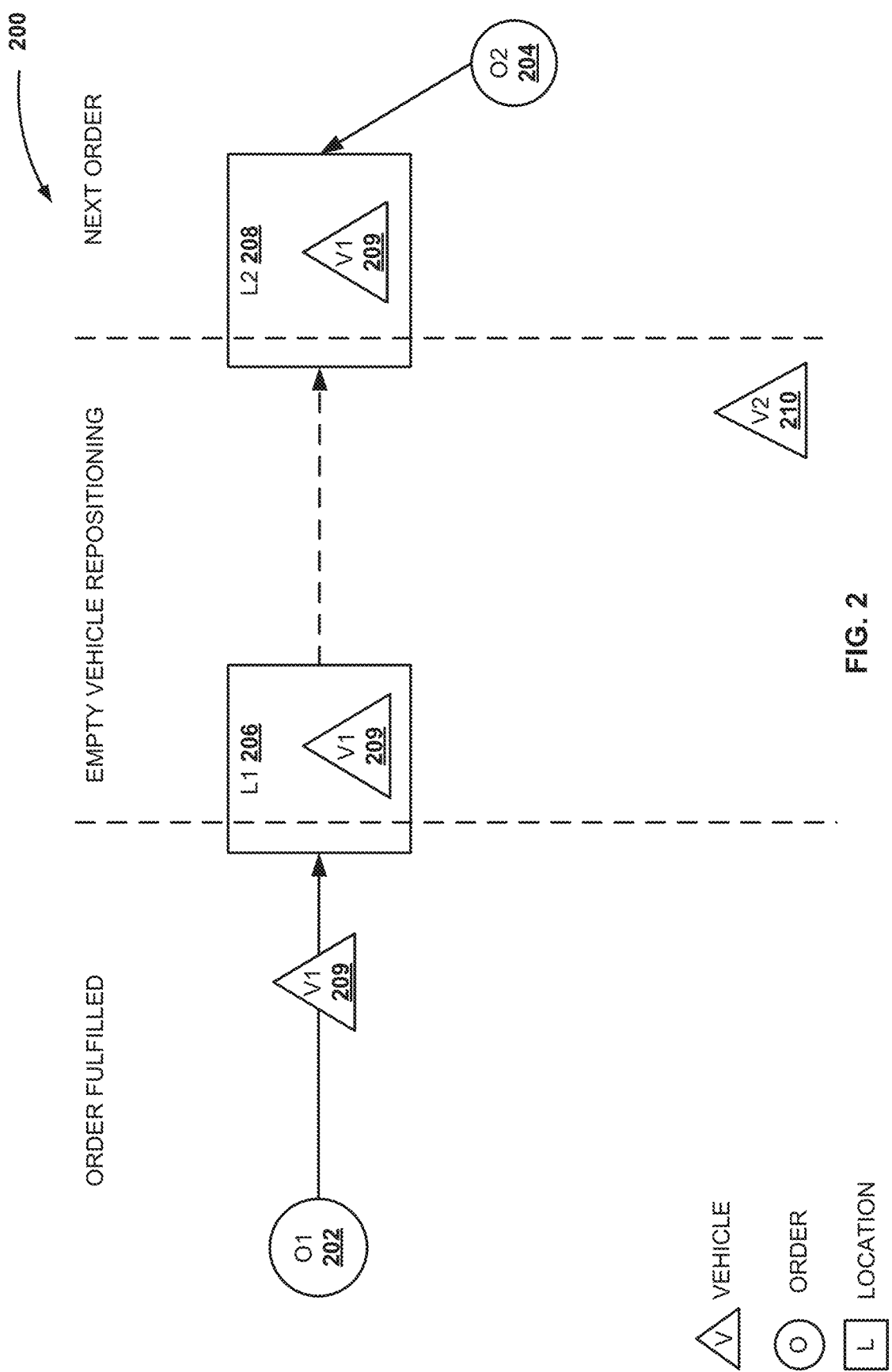
FIG. 2 is a flow diagram illustrating repositioning of a vehicle, according to an embodiment.

FIG. 2 is a flow diagram 200 illustrating movement or repositioning of a vehicle, according to one embodiment. Nodes 'O1' 202 and 'O2' 204 represent orders, nodes 'L1' 206 and 'L2' 208 represent locations, and nodes 'V1' 209 and 'V2' 210 represent vehicles. The flow represented by broken line arrow indicates a direction of movement of an empty vehicle (i.e., empty vehicle repositioning). Order 'O1' 202 might be fulfilled and vehicle 'V1' 209 gets emptied at location 'L1' 206. Order 'O2' 204 is yet to be delivered and requires a vehicle. The vehicle requested by order 'O2' 204 may be same or compatible with the vehicle 'V1' 209. Therefore, the empty vehicle 'V1' 209 can be repositioned to the location 'L2' 208 to load order 'O2' 204 to start vehicle movement for delivering order 'O2' 204 (e.g., to another location). Due to the integration between components EVR, VC, TD, WC, LSC, RC, and OP and the existing stock in planning cockpit (e.g., the planning cockpit 112 of FIG. 1), the empty vehicles (e.g., vehicle 'V1' 209) may be synchronized with the booking or order 'O2' 204 and repositioned to fulfill the order 'O2' 204. In an embodiment, the planning cockpit (e.g., the planning cockpit 112 of FIG. 1) may assign, allocate, or reposition, the vehicles in an optimized and efficient fashion. For example, the planning cockpit may determine that at the time the vehicle 'V1' 209 gets emptied, there is another vehicle 'V2' 210 which also gets emptied at location 'L2' 208, itself. The planning cockpit determines whether the emptied vehicle 'V2' 210 is compatible with the vehicle requirement of order 'O2' 204. When the vehicle 'V2' 210 is compatible, there is no requirement to move or reposition the vehicle 'V1' 209 from the location 'L1' 206 to the location 'L2' 208 as the vehicle 'V2' 210 may itself be used to fulfill the order 'O2' 204. Therefore, the repositioning time, the operational cost, and the repositioning cost may be saved by optimized and efficient allocation of vehicles. The empty vehicle 'V1' 209 may be retained at location 'L1' 206 itself for next order fulfillment from location 'L' 206 or may be repositioned to some different nearest location where the vehicle 'V1' 209 is required (e.g., based upon compatibility test).

Figure 3:
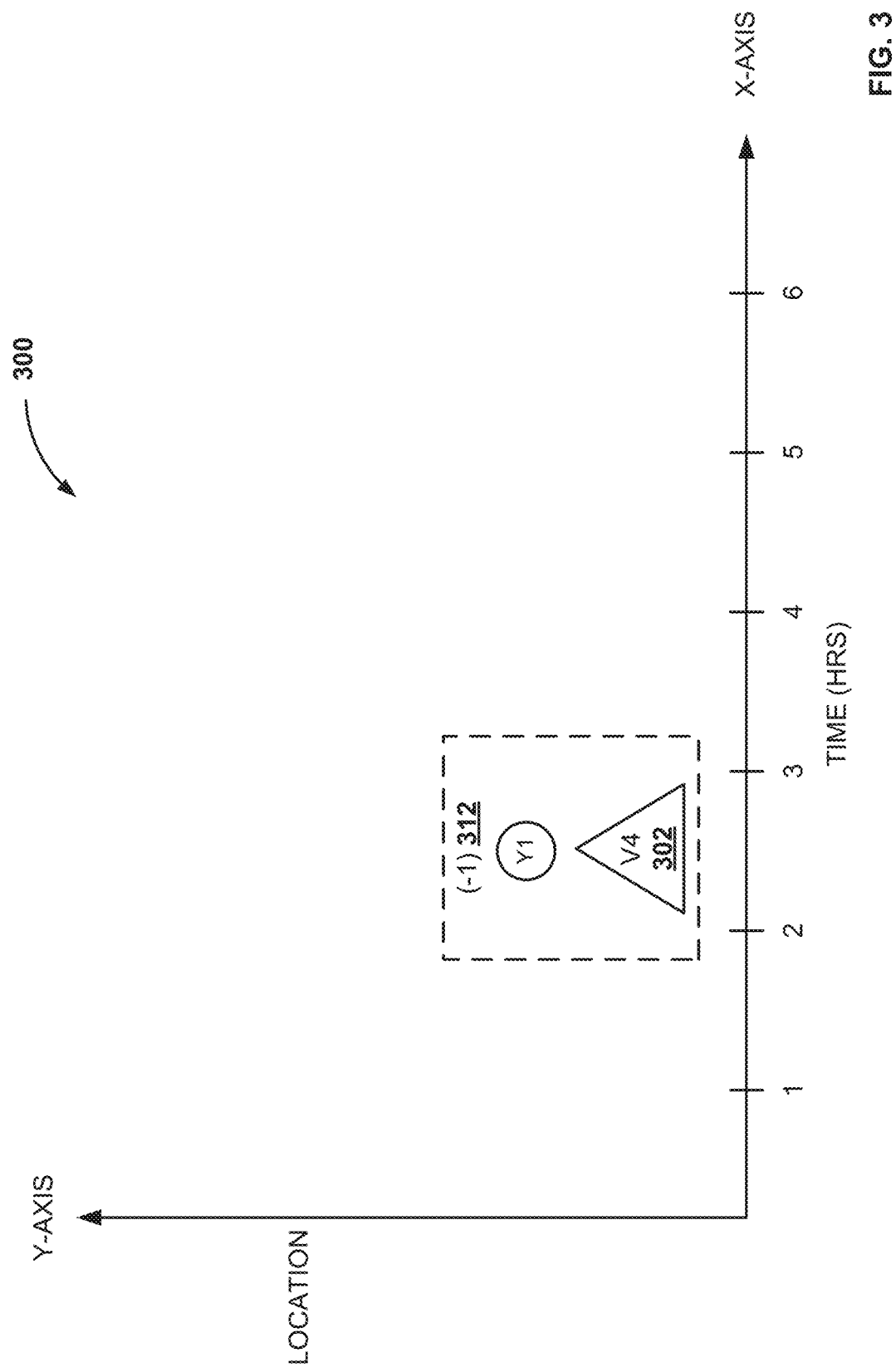
FIG. 3 is a graphical representation illustrating waiting period, according to an embodiment.

FIG. 3 is an exemplary graphical representation 300 illustrating waiting period related to vehicle 'V4' 302, according to an embodiment. The vehicle 'V4' 302 arrives at location 'Y1' (e.g., source location) at time '2' and departs at time '3' to fulfill an order (i.e., order start time is '3'). Therefore, waiting period at source location Y1 would be 3−2=1 hr. Supply and demand of vehicle in location 'Y1' is '−1' 312. Supply and demand '−1' 312 indicates a deficit of one vehicle at location 'Y1'. Positive value of supply and demand indicates that location has access vehicles to fulfill orders and some of them at the same location might be empty that can be repositioned. Waiting cost at location 'Y1' may be $100 from 1-5 hrs. Therefore, the waiting cost for vehicle 'V4' 302 at location Y1 would be $100. The waiting cost at various locations, the supply and demand of vehicles at various locations, and the repositioning cost of vehicles (i.e., to move the vehicles from one location to another) may be considered to assign vehicles to various locations. A vehicle may be assigned from a source location to a destination location through an empty reposition or a loaded movement of the vehicle from the source location to the destination location.

FIG. 4A is an exemplary graphical representation displaying assignment of vehicles for empty reposition, loaded move, and waiting period according to an embodiment. In an embodiment, a graph 400 is generated to assign resources (e.g., vehicles) to different orders. In an embodiment, the assignment module may be a part of a resource execute module (e.g., the resource execute module 124 of FIG. 1) or a planning cockpit (e.g., the planning cockpit 112 of FIG. 1). While assigning resources or vehicles to orders, waiting costs, long stand cost, and repositioning costs may be considered. The graph 400 is illustrated with locations (stations) depicted on 'y axis' and time (e.g., in number of days) depicted on 'x axis.' Different locations from where orders are dispatched and are to be delivered are considered as different nodes in the graph. A source location and destination location nodes are generated each time an order is placed. The vehicles in different locations in the schedule is considered as different nodes in the graph. In an embodiment, a new node is generated each time a vehicle visits a station. A node is identified with a unique node identifier (node_ID). In FIG. 4A, source locations are illustrated as dark colored (e.g., gray) circles and destination locations are illustrated as light colored (e.g., white) circles. The arrow represents the movement of the vehicle.

The node (destination or source location) of empty repositioning (ER) may be represented by various parameters. For example, a destination node of ER is represented by four parameters: (S, D, Q, W) where S represents destination station of ER (ID or name)/the source location of a customer order, D represents start date (i.e., planned date to fulfill the order), Q represents the quantity of demand, and W represents wagon (vehicle) type for the order. Similarly, a source location of an ER is represented by four parameters: ($\overline{S}$, $\overline{D}$, $\overline{Q}$, $\overline{W}$) where $\overline{S}$ represents source station of ER (ID or name), $\overline{D}$ represents available date (i.e., feasible date when the vehicle can move or is ready to dispatch and transport the order), $\overline{Q}$, represents the quantity of supply, and $\overline{W}$ represents wagon (vehicle) type of the supply. There are three types of arc that may be generated between the source and destination node namely: (i) waiting arc (e.g., represented by dotted line arrow), (ii) empty reposition arc (e.g., represented by broken line arrow), and (iii) loaded move arc (e.g., represented by solid line arrow). A valid arc from one node to another (i.e., from supply to demand) in the graph 400 is determined based on three validity conditions namely: (i) there is network (e.g., vehicle connectivity) from source to destination node. This can be checked from NETWORK_TABLE which includes information about whether there is network from one node or station to another: (ii) whether wagon type of order (W) and wagon type of supply ($\overline{W}$) is compatible. This can be checked from COMPATIBILITY_TABLE: and (iii) whether the difference between start date and available date (D−$\overline{D}$)≥d($\overline{S}$, S), where d($\overline{S}$, S) is the transportation duration from $\overline{S}$ to S from the NETWORK_TABLE (includes information on time duration for reaching from one station to another). Therefore, duration to fulfill the order must be either greater than or equal to the duration to reach from the source station to destination station. When D−$\overline{D}$≥0, i.e., when start date (demand date) is far (i.e., greater) than the available date (supply date), there is time to fulfill the order and the vehicle can wait, so D−$\overline{D}$≥0 indicates no movement of vehicle (vehicle waiting). In an embodiment, when the start date (demand date) is equal to the available date (supply date) then also there is no movement (waiting) as both the dates are equal there is no time to move the vehicle and order may not be fulfilled, therefore, vehicle may be kept in waiting.

Based upon the above mentioned three validity conditions and various costs constraints and revenue generation, any of the three types of valid arcs are generated or assigned between nodes. The graph 400 is generated after determining various costs constraints and revenue generation. Based upon the optimized calculation (e.g., minimum cost arc) the arcs may be assigned between the nodes.

For calculating minimum cost arc, the waiting cost and the repositioning cost may be calculated. For example, from node i to node j, let $(i,j) \in A$ be the arc, where A is a valid arc set including valid arcs {waiting arc, empty reposition arc, loaded move arc}. The empty repositioning cost and waiting cost may be determined as $c_{ij}$. The symbol $x_{ij}$ may represent the moving quantities (number of vehicles) on the arc, $w_j(t)$ may represents the waiting cost at node j for t number of days and r(i,j) be the repositioning cost from node i to node j. Therefore, the "empty repositioning cost and waiting cost" ($c_{ij}$) may be determined using:

$$c_{ij, i<>j} = r(i,j) + w_j(D - \overline{D} - d(\overline{S}, S))$$

$$c_{ii} = w_i(D - \overline{D}).$$

Where i is not equal to j (i.e., i<>j or the source and destination nodes are different nodes or at different locations and not the same).

The empty repositioning cost and waiting cost from node i to j (i.e., $c_{ij}$) is sum of:
(i) repositioning cost from node i to node j (i.e., r(i,j)); and
(ii) waiting cost at node j (i.e., $w_j$) for waiting period {(time left to fulfill the order $D-\overline{D}$)−(travel duration or transportation duration from node i to node j)}, i.e., $w_j(D-\overline{D}-d(\overline{S},S))$. In an embodiment, the waiting cost at node i (i.e., $c_{ii}$) if any, for waiting period $D-\overline{D}$ (i.e., time left to move vehicle to fulfill the order, i.e., $w_i(D-\overline{D})$) may also be considered.

Once the empty repositioning cost and waiting cost from node i to j is determined, the revenue generated from the order (i.e., by fulfilling the order from node i to node j) may be determined as $rev_{ij}$ (the revenue on arc (i,j)). A network flow solver (NFS) may be executed. The network flow solver may be a solver based on network simplex. In an embodiment, the network flow solver may maximize the total profit (i.e., maximize (generated revenue-cost invested in fulfilling the order)). The cost invested may be the empty repositioning cost and waiting cost. Therefore, the network flow solver is executed to maximize total profit subject to arc constraint (i.e., $(i,j) \in A$) and balance between demand and supply. The network flow solver is executed using below mathematical model:

$$\max \cdot \sum_{(i,j) \in A} (rev_{ij} - c_{ij}) x_{ij}$$

$$\text{s.t.} \sum_{i:(i,k) \in A} x_{ik} - \sum_{j:(k,j) \in A} x_{kj} = -b_k, k \in N$$

$$x_{ij} \geq 0, (i,j) \in A$$

As shown, the network flow solver maximizes profit or net revenue (i.e., total revenue generated from order ($rev_{ij}$)−cost incurred in delivering the order ($c_{ij}$)). The net revenue or profit generated for each quantity of item ($x_{ij}$) or vehicle is calculated and cumulated. The network flow solver then executes the mathematical model to maximize the net profit generated from delivering the order from node i to node j. In an embodiment, the mathematical model for maximizing profit is executed subject to (s.t.) various constraints such as arc is a valid arc, i.e., $(i,j) \in A$, and inflow (supply of vehicles)-outflow (demand of vehicles)=some natural number N, negative N shows that demand is more than supply (deficit) whereas positive N shows that supply is more than demand (surplus). It should be noted that x is subject to (s.t.) equation representing number of vehicles. Similar calculation or determination can be made for other source nodes and their corresponding destination nodes. In an embodiment, the maximized profit might also be considered along with demand/supply balance between source and destination nodes. The minimum cost arc (maximum profit arc) from node i to node j is then selected and assigned. For example, loaded move arc may be determined as the minimum cost arc from node n1 to node n2 and therefore, loaded move arc may be assigned from node n to node n2.

In an embodiment, it may be determined whether the sum of reposition cost and waiting cost at destination station (i.e., $c_{ij}$) is greater than standing or waiting cost of the vehicle at source station (i.e., $c_{ii}$). Based upon the determination, the reposition of the vehicle may be delayed. In an embodiment, the waiting cost or long stand cost of the vehicle is compared at different stations and then repositioning of the vehicle may be determined (e.g., delay of reposition date). The minimum cost arc may be determined for the graph (e.g., the graph 400 of FIG. 4).

The minimum cost arc (from node i to node j) may be determined based on possible delays, for example, using:

$$c_{ij, i<>j} = \min_{delay}(w_i(\text{delay}) + r(i,j) + w_j(D - \overline{D} - d(\overline{S}, S) - \text{delay})),$$

Where $c_{ij, i<>j}$ represent reposition and waiting cost (i.e., cost are from node i to node j) and i is not equal to j (i.e., i and j are distinct or different nodes). Therefore, $c_{ij}$, has to be minimum, i.e., lowest possible cost for moving vehicle from i to j. $W_i(\text{delay})$ Represents waiting cost at node i which is multiplied by delay (i.e., waiting at node i), r(i,j) represents reposition cost from i to j, and $w_i(D-\overline{D}-d(\overline{S},S))$−delay) represents waiting cost at node j which decreases based upon delay at node i. Therefore, the minimum of $w_i(\text{delay})$, r(i,j), and $w_j(D-\overline{D}-d(\overline{S},S))$−delay is selected or the minimum of $w_i(\text{delay})$ and $\{r(i,j)+w_j(D-\overline{D}-d(\overline{S}, S)-\text{delay})\}$ is selected. Therefore, the reposition is done when reposition cost is less than the waiting cost or long stand cost at the source station or when the sum of reposition cost and the waiting cost at the destination station is less than the waiting cost or long stand cost at the source station.

Figure 4B:
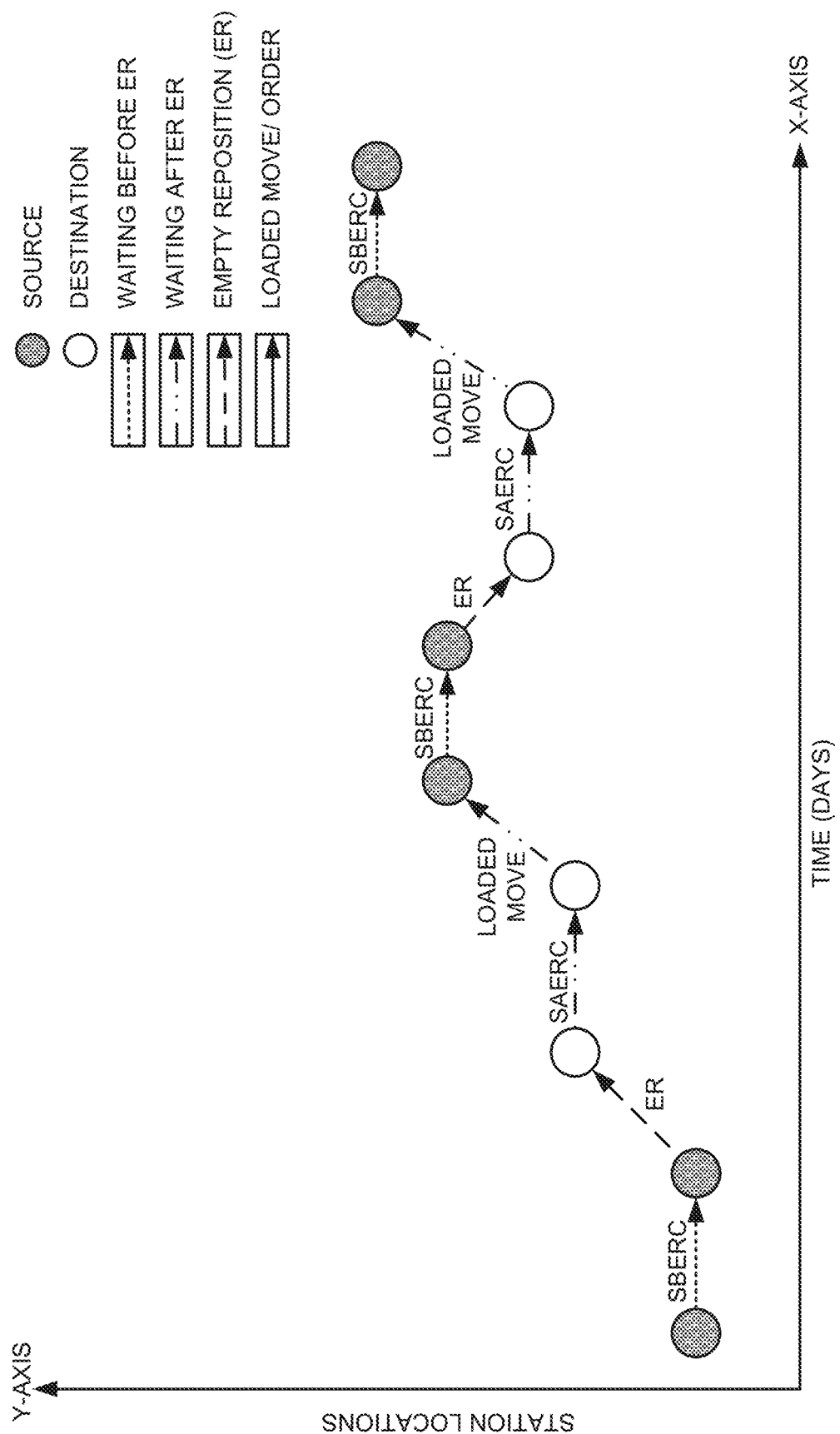

FIG. 4B is an exemplary graphical representation displaying assignment of vehicles in relation to empty repositioning (ER). In an embodiment, a graph 410 is generated considering empty repositioning for assigning resources (e.g., vehicles) to different orders. While assigning resources or vehicles to orders, empty repositioning costs (ERC), stand before empty repositioning cost (SBERC), and stand after empty repositioning cost (SAERC) may be considered. The graph 410 is illustrated with locations (stations) depicted on 'y axis' and time (e.g., in number of days) depicted on 'x axis.' Different halt locations or stations of vehicles are considered as different nodes in the graph. A source location indicates a station where vehicle gets emptied, i.e., where an order is delivered and vehicle gets emptied. The source location is a starting point of empty repositioning (ER). Therefore, the source location of ER may be a destination location of some order. The source locations are illustrated as dark colored (e.g., gray) circles. A destination location indicates a station where empty vehicle is brought to start loading the empty vehicle to start delivery of an order. Therefore, the destination location is a source location for some order. The destination stations are illustrated as light colored (e.g., white) circles. The arrow represents the movement of the vehicle.

There may be four types of valid arcs that may be generated between the source and destination node with reference to empty repositioning namely: (i) waiting before empty reposition arc (e.g., represented by dotted line arrow), (ii) waiting after empty reposition arc (e.g., represented by broken and dotted line arrow), (iii) empty reposition arc (represented by broken line arrow), and (iv) loaded move arc (represented by solid line arrow). Any of the four types of valid arc may be generated or assigned based upon the above discussed three validity conditions and various costs constraints (e.g., empty repositioning costs (ERC), stand before empty repositioning cost (SBERC), and stand after empty repositioning cost (SAERC), etc.) and revenue generation. The assignment module generates the graph 410 after determining various costs constraints and revenue generation. Based upon the optimized calculation (e.g., minimum cost arc and maximized profit) the arcs may be assigned between the nodes.

In an embodiment, to improve the order fulfillment rate (i.e., total number of fulfilled orders/(total number of orders)), the "start date" (denoted as D) may be delayed. When the start date D is delayed or increased, the feasibility condition (D−$\overline{D}$≥d($\overline{S}$, S)) or number of days remaining for fulfilling the order increases which improves or increases the order fulfillment rate.

Figure 5:
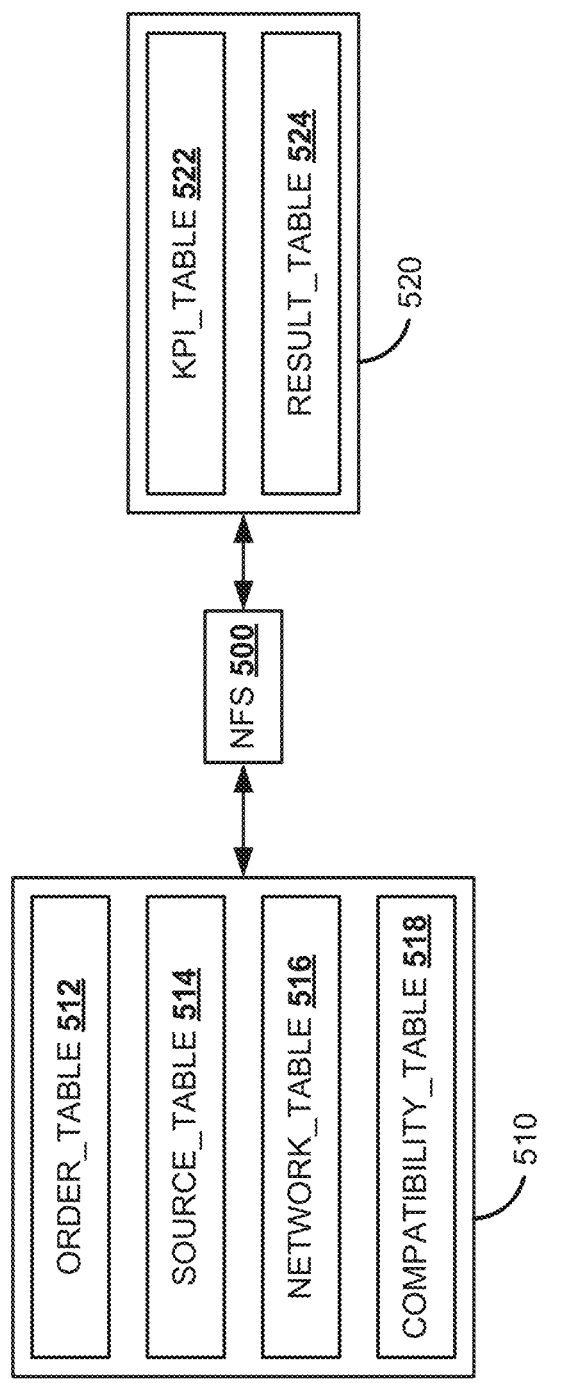
FIG. 5 is a block diagram illustrating output tables generated by network flow solver based upon various input tables, according to an embodiment.

FIG. 5 is a block diagram illustrating a network flow solver (NFS) 500, according to an embodiment. The NFS 500 reads INPUT_TABLES 510 including ORDER_TABLE 512 (including details of customer's order or information related to order), SOURCE_TABLE 514 (including details or information related to the source or outlet supplying the order), NETWORK_TABLE 516 (including information related to connectivity between various stations, travel time between stations, and corresponding transportation cost), and COMPATIBILITY_TABLE 518 (including information about replacement or alternate vehicles or wagons). Based upon the information of the INPUT_TABLES 510, the nodes (e.g., nodes n1 and n2 of FIG. 4) are created, graph (e.g., the graph 400 of FIG. 4) is generated, and mathematical model for maximizing profit with optimal utilization of vehicles is executed. In an embodiment, OUTPUT_TABLES 520 may be generated. The OUTPUT_TABLES 520 includes KPI_TABLE 522 (including information related to various KPIs) and RESULT_TABLE 524 (including information related to fulfilled orders). The KPI_TABLE 522 may be monitored in real time or at a predefined time interval, e.g., by the planner. Various KPIs of the KPI_TABLE 522 are monitored and fed to various modules/components (e.g., the resource execute module, the NFS 500, etc.) to consider existing KPIs and generate execution plan for vehicle schedule, empty vehicle repositioning, arc assignment to nodes in the graph, etc.

FIGS. 6A and 6B are exemplarily tables illustrating input and output to the network flow solver (e.g., the network flow solver 500 of FIG. 5), according to an embodiment. The network flow solver reads ORDER_TABLE 610, NETWORK_TABLE 620, COMPATIBILITY_TABLE 630, and SOURCE_TABLE 640 to generate RESULT_TABLE 650 and KPI_TABLE 660. In the ORDER_TABLE 610, row 670, shows that an order is placed with an order_ID 001, source station location (SOURCE) 'A,' destination or order station location (ORDER) 'B,' start date (START) '12/30/2000,' duration (DUR) '12 hrs.,' required number of wagons (DEMAND) '5,' revenue if the order is delivered on time (REV) '500$,' revenue with 1 day delay (REV1) '450$,' revenue with 2 days delay (REV2) '400$,' revenue with 3 days delay (REV3) '300$,' waiting cost threshold after empty reposition and before loaded movement (WCOSTHRES) '7 days,' waiting cost per day or waiting cost per unit (wagon) per day above threshold (i.e., WCOSTHRESA) '50$,' waiting cost per day or waiting cost per unit (wagon) per day below threshold (i.e., WCOSTHRESB) '30$,' waiting cost threshold before empty reposition and after loaded movement (WCOSTHRESD) '7 days,' waiting cost per day or waiting cost per unit (wagon) per day above threshold (i.e., WCOSTHRESDA) '50$,' waiting cost per day or waiting cost per unit (wagon) per day below threshold (i.e., WCOSTHRESDB) '30$,' required model of vehicle or wagon based upon order (MODEL) 'PQR,' and priority of order (PRIORITY) 'high'.

Based upon the ORDER_TABLE 610, the source and destination station (SOURCE and ORDER from ORDER_TABLE 610) is identified. Once the source and destination station (i.e., A and B) is identified, NETWORK_TABLE 620 is read. The NETWORK_TABLE 620 includes name of stations, e.g., source station (FROM) and destination station (TO), time taken to reach from source station to destination station (TIME), and transportation cost involved in travelling from source station to destination station (TRANSCOST). As shown, row 674 shows that there is route or network from A to B and time to travel from A to B is 12 hrs, and transportation cost is 70$. Once the network connectivity, distance, and time is determined, the availability of required vehicle or wagon (MODEL: PQR) is checked. In case the vehicle or wagon PQR is not available at the SOURCE station 'A', the COMPATIBILITY_TABLE 630 is read to determine replacement or alternate compatible vehicle or wagon. The COMPATIBILITY_TABLE 630 includes the wagon or vehicle name or ID (MODEL) and its alternate or replacement vehicle or wagon (REPLACEMENT_MODELS). For example, it may be determined through row 676 that PQR can be replaced by XYZ or MNO. Therefore, in case PQR is not available at the SOURCE station 'A', availability of XYZ or MNO may be checked at SOURCE station 'A' and if any of XYZ and MNO is available, they can be used to fulfill the order (order_ID: 001). In an embodiment, when there is no network between source and destination and/or there is no compatible vehicle or wagon corresponding to the required vehicle or wagon, a notification may be displayed.

In an embodiment, the details regarding any station (e.g., source station or SOURCE) may be checked or read through the SOURCE_TABLE 640. For example, once the ORDER_TABLE 610 is read, the source is identified (e.g., source station: A). The details related to the source station A may be read through the SOURCE_TABLE 640. Row 678 of the SOURCE_TABLE 640 indicates that the available date (AV_DATE) or feasible date for starting the vehicle for delivery is '1/1/2001,' i.e., 1 day after the start date (START) of the ORDER_TABLE 610 (it might be due to the fact that 12/30/2000 may be falling on weekend). The available number of wagons (SUPPLY) is '4' at station A which is 1 less than the required number of wagons '5' (DEMAND from ORDER_TABLE 610). Therefore, supply is less than demand and station 'A' lacks vehicle or wagons to fulfill the orders. The waiting cost threshold and waiting cost may differ for different stations. For example, the waiting cost threshold (WCOSTHRES) for station A is '7 days,' waiting cost above threshold (WCOSTHRESA) as '50$,' waiting cost below threshold (WCOSTHRESB) as '30$,' and available wagon model or vehicles at station A is 'PQR, MNO, XYZ, and STU.' The NFS reads input tables 610-640 and assigns optimal resources to fulfill the orders of the ORDER_TABLE 610.

The NFS generates RESULT_TABLE 650 and KPI_TABLE 660, as shown in FIG. 6B. The RESULT_TABLE 650 shows information related to fulfilled orders, e.g., order fulfilled from which station on which date using which wagon model or vehicle with the quantities for each order. The RESULT_TABLE 650 includes ID number of order (ORDER_ID) '001,' order priority (PRIORITY) 'high,' source station location (SOURCEST) of the order 'A,' available date when the vehicle started for delivery (AVDATE) '1/1/2001,' execution date of repositioning (EXEDATEREPO) '12/30/2000,' duration of reposition (REPODUR) '12 hrs,' order's start location (ORSTATION) 'A,' order's destination station or location (ORDESTINATION) 'B,' order original start date or original planned date of movement of vehicle (ORSTDATE) '12/30/2000', order actual start date (ACSTDATE) or actual start date of vehicle (e.g., due to some delay the actual date may differ from the planned date) '1/1/2001', duration to deliver the order (DUR) '15 hrs,' required vehicle or wagon model to deliver the order (MODEL) 'PQR,' the supplied vehicle or wagon model (e.g., in case the required model is not available at source station), i.e., SUPPLYMODEL 'MNO,' the order's demand quantity (ORDERDEMAND) '1000 ,' the supplied quantities (QUANTITY) '1000,' total cost (TOTCOST) 'sum of waiting and repositioning cost and/or transportation cost,' '50$,' revenue generated from order (REVENUE) '500$,' and net profit from the order (PROFIT) 'REVENUE-TOTCOST' '500$-50$=450$.'

The KPI_TABLE includes various KPIs related to order that may be required to be monitored. In an embodiment, the KPI_TABLE 660 may include the net or total profit generated from delivering the orders (PROFIT) '4450$,' the average order fulfillment rate (FULFILLRATE) '0.5,' fulfillment rate of order having or with priority 1 (FULFILLRATE1) '1,' fulfillment rate of order having or with priority 2 (FULFILLRATE2) '1,' fulfillment rate of order having or with priority 3 (FULFILLRATE3) '1,' fulfillment rate of order having or with priority 4 (FULFILLRATE4) '0.5,' and the number of reused vehicles (REUSE) '5.' The KPIs may be collected at predefined time interval, e.g., per day. In an embodiment, the KPI_TABLE 660 is generated based upon the RESULT_TABLE 650 (e.g., aggregating all delivered orders from RESULT_TABLE 650).

In an embodiment, there may be an unfulfilled order table (not shown) which maintains information related to unfulfilled orders. The format of the unfulfilled order table may be similar or same to the ORDER_TABLE 610 (FIG. 6A). The unfulfilled orders may be updated by determining difference between the demand (orders) and supply (fulfilled orders). In an embodiment, the unfulfilled order table is an output table which is regularly updated based upon determined unfulfilled orders. In an embodiment, the unfulfilled order table (output table) may be used or provided as an input table to determine and assign resources or vehicles to the existing and unfulfilled orders.

For the above exemplary use case, the NFS may also solve or compute the optimal flow between the source and the order. In an embodiment, the network flow solver or NFS is invoked to solve or compute the optimal flow between the source and the order. The NFS is executed to determine flow between supply and demand, i.e., supply and demand flow. In an embodiment, the network flow solver (NFS) is executed iteratively until the order fulfillment convergences (i.e., becomes constant). For example, until the order fulfillment rate (i.e., the fulfilled order demand/overall demand) in current iteration is equals to the order fulfillment rate in the next iteration.

The NFS uses SUPPLY_DEMAND table and COST table to generate FLOW table or to determine demand/supply flow. The SUPPLY_DEMAND table illustrates supply and demand of vehicles at a station or node, i.e., (number of vehicles supplied)-(number of vehicles demanded), at the station or node. An exemplarily format of the SUPPLY_DEMAND table may be as shown below:

| NODE_ID | SUPPLY_DEMAND |
|---------|---------------|
| A       | -1            |
| B       | 2             |

The SUPPLY_DEMAND table includes NODE_ID field which identify the node or station where the flow of vehicles is determined and SUPPLY_DEMAND field which indicates the flow of vehicle (SUPPLY-DEMAND). The positive value of SUPPLY_DEMAND indicates that supply is greater or more than demand (requirement) and there is surplus of vehicles at the station (i.e., station is a SUPPLY node) whereas negative value of SUPPLY_DEMAND indicates that demand is more than supply, (i.e., requirement is more than availability) and there is deficit of vehicles at the station (i.e., station is a DEMAND node). Therefore, station A is a DEMAND node which is deficit of 1 vehicle and station B is a SUPPLY node which has 2 extra or surplus vehicles.

The COST table shows cost involved or incurred in moving the vehicle(s) from one station to another. The cost incurred may be sum of transportation cost, reposition cost, and/or waiting cost. An exemplarily format of the COST table may be as shown below:

| FROM_ID | TO_ID | LOWER | CAPACITY | COST |
|---------|-------|-------|----------|------|
| A       | B     | 0     | 50       | 50$  |

The COST table includes FROM_ID field indicating ID of a source station (i.e., A) from where the vehicle is moved to deliver the order, TO_ID field indicating ID of a destination or order station (i.e, B) where the vehicle is to brought to deliver the order, LOWER field indicates lower bound or minimum number of vehicles which can be moved from 'A' to 'B,' CAPACITY field indicates upper bound or maximum number of vehicles which can be moved from 'A' to 'B' (e.g., maximum 50 vehicles can be moved from A to B), and COST field indicates the total cost incurred (e.g., 50$) in bringing the vehicle(s) from the source station (A) to the destination station (B).

The SUPPLY_DEMAND table and the COST table is used to generate a flow graph (not shown). The flow graph shows the stations (e.g., A and B) as nodes and arc representing minimum and maximum number of vehicles from station A to station B and cost incurred in moving vehicles from station A to station B. The flow graph is generated considering the network between the stations (i.e., A to B) and duration constraint, i.e., STARTDATE-DATE>=TIME (where STARTDATE is the order start date from station B, DATE is the available date of empty railcar in station A and TIME is a time duration to reach from station A to station B). The NFS solves the generated flow graph to determine or compute the supply and demand or optimum flow of vehicle from A to B. The NFS generates the FLOW table. Therefore, based upon the SUPPLY_DEMAND table (illustrating nodes with surplus or deficit vehicles) and COST table (illustrating cost for moving the vehicles between nodes and maximum number of vehicles that can be moved, etc.), the NFS determines optimal flow of vehicles between the nodes, i.e., optimal number of vehicles that can be moved between stations. The flow (demand/supply) may be represented in the FLOW table.

The FLOW table shows optimal number of vehicles or containers which would be transported from one station (e.g., A) to another station (e.g., B). An exemplarily format of the FLOW table may be as shown below:

| FROM_ID | TO_ID | FLOW |
|---------|-------|------|
| A       | B     | 50   |

The FLOW table includes FROM_ID field which indicates ID of a source station (i.e., A) from where the vehicle is moved to the destination, TO_ID field which indicates ID of a destination or order station (i.e., B) where the vehicle is to be brought (e.g., to deliver the order), and FLOW field which indicates the number of vehicles to be moved from station 'A' to station 'B.' In an embodiment, the number of vehicles to be moved from station 'A' to station 'B' includes loaded vehicles or empty vehicle moved or repositioned for delivering orders.

The NFS solves the graph to generate the FLOW table. When fulfilled order (destination) becomes a new resource to fulfill unfulfilled orders, the NFS is invoked/executed again to compute new supply and demand flow. In an embodiment, a default maximum number of iterations for NFS may be set as 10000. The NFS stops when order fulfillment rate gets constant and there is no further improvement or when number of times the NFS is executed exceeds maximum number of iterations. In an embodiment, the unfulfilled orders may be successively delayed until the profit does not increase any more.

Figure 7:
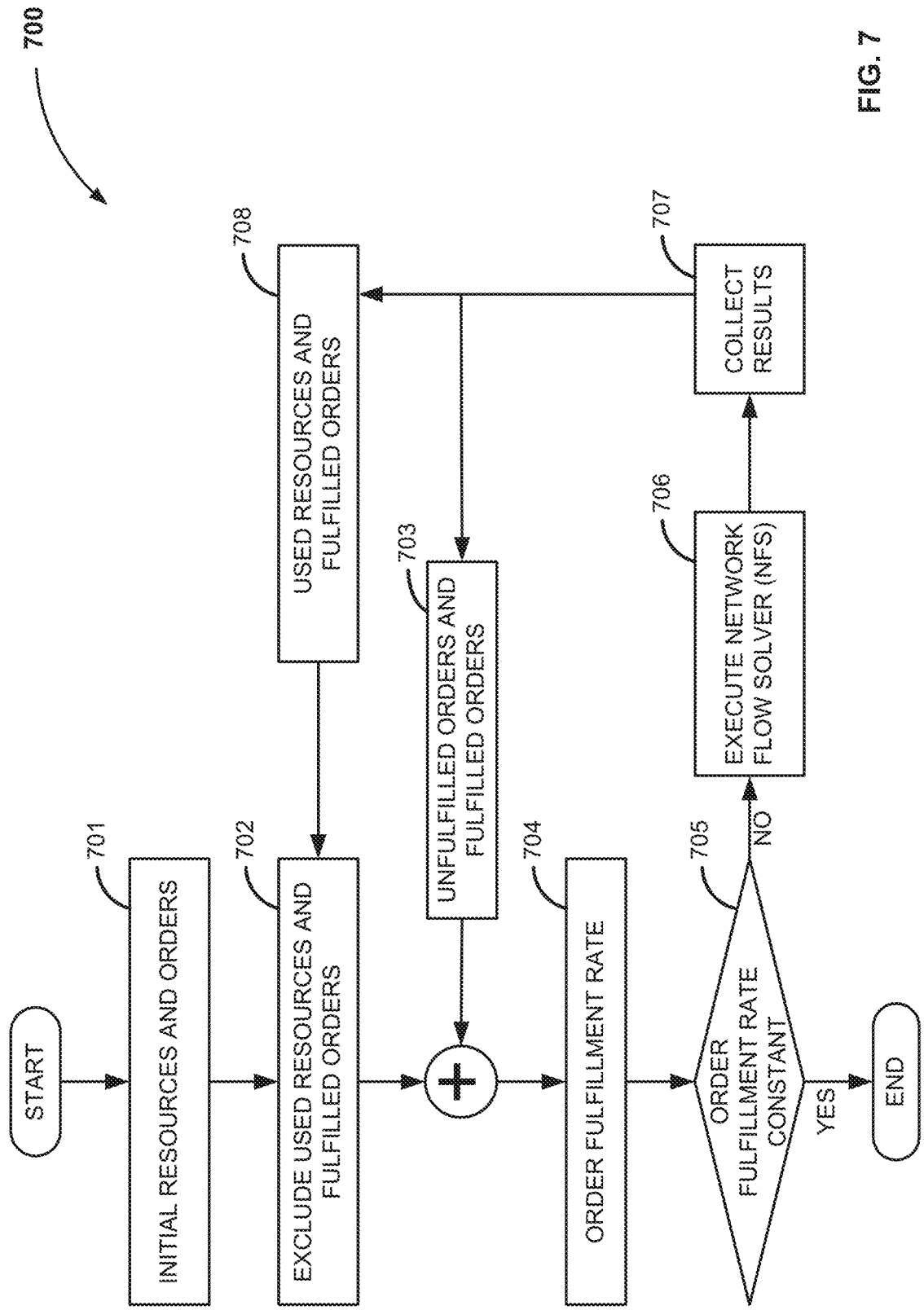
FIG. 7 is a flow diagram illustrating a process of computing supply-demand flow, according to an embodiment.

FIG. 7 illustrates a flow diagram for computing supply-demand flow, according to an embodiment. At 701, initial resources and orders are determined. The resources may be determined through a resource data table storing information related to one or more resources (e.g., the SOURCE_TABLE 514 of FIG. 5). The resources may be any vehicles such as railcars which is used to fulfill orders. Used resources and fulfilled orders are excluded from the initial resources and orders to determine currently available resources and orders at 702. Unfulfilled orders and fulfilled orders are determined at 703. The resources from fulfilled orders are added as new available resources in currently available resources. The currently available resources (block: 702) and the unfulfilled orders and fulfilled orders (block: 703) are aggregated to determine order fulfillment rate, i.e., (order fulfilled/total order) at 704. At 705, it is determined whether the order fulfillment rate becomes constant (i.e., order fulfillment rate in current iteration is equals to the order fulfillment rate of previous or next iteration). When the order fulfillment rate convergence, the NFS stops. When the order fulfillment rate does not convergence, the NFS is executed at 706. The result (e.g., from the FLOW table) is collected at 707. Based upon the collected result, the unfulfilled orders and fulfilled orders are determined at 703 and the used resources and fulfilled orders are determined at 708. The used resources and fulfilled orders are feed to block 702 to exclude the used resources and fulfilled orders to determine currently available resources and orders at 702. Therefore, the NFS is executed iteratively until the order fulfillment rate convergence or becomes constant (i.e., until there is no further scope for improvement of the order fulfillment rate).

In an embodiment, the order priority may be handled by two ways: (i) successively assigning the vehicles to orders based upon order's priority, i.e., high priority order is assigned vehicle prior or first compared to low priority order; and (ii) generating a priority table (e.g., showing repositioning cost for orders based on their priority) and assigning vehicles based upon the information in the priority table. The priority table comprises fields such as priority parameter (e.g., $\alpha 1$, $\alpha 2$, $\alpha 3$, $\alpha 4$, etc.) of corresponding priority orders and repositioning cost for respective priority orders. The priority parameters (e.g., $\alpha 1$, $\alpha 2$, $\alpha 3$, $\alpha 4$, etc.) indicate priority of the order, $\alpha 1$ being highest priority parameter indicating highest priority order, and $\alpha 4$ being lowest priority parameter indicating lowest priority order. The value of highest priority parameter ($\alpha 1$) is lowest. e.g., 0 and the value of the lowest priority parameter ($\alpha 4$) is the highest, e.g., 1. Therefore, value of priority parameter may be $\alpha 1=0$, $\alpha 2=0.5$, and $\alpha 3=\alpha 4=1$, where $\alpha 1$ being the highest priority parameter with lowest value (0), $\alpha 2$ is lower priority parameter than $\alpha 1$ with value 0.5, and $\alpha 3$ and $\alpha 4$ is the lowest priority parameter with value 1. The repositioning cost for priority order is calculated by multiplying the priority parameter of the priority order with the actual repositioning cost. For example, if the actual repositioning cost for moving the vehicle from station A to B is 50$, and the order to be delivered from A to B is the highest priority order (order with parameter $\alpha 1=0$), then the repositioning cost for this priority order would be zero (e.g., 50$*0=0). Consequently, as the repositioning cost is least or 0 for the highest priority order and therefore, the highest priority order would be delivered first. In an embodiment, the repositioning and delivery may be delayed to optimize use of vehicles, minimize operational costs, and maximize profit.

Figure 8:
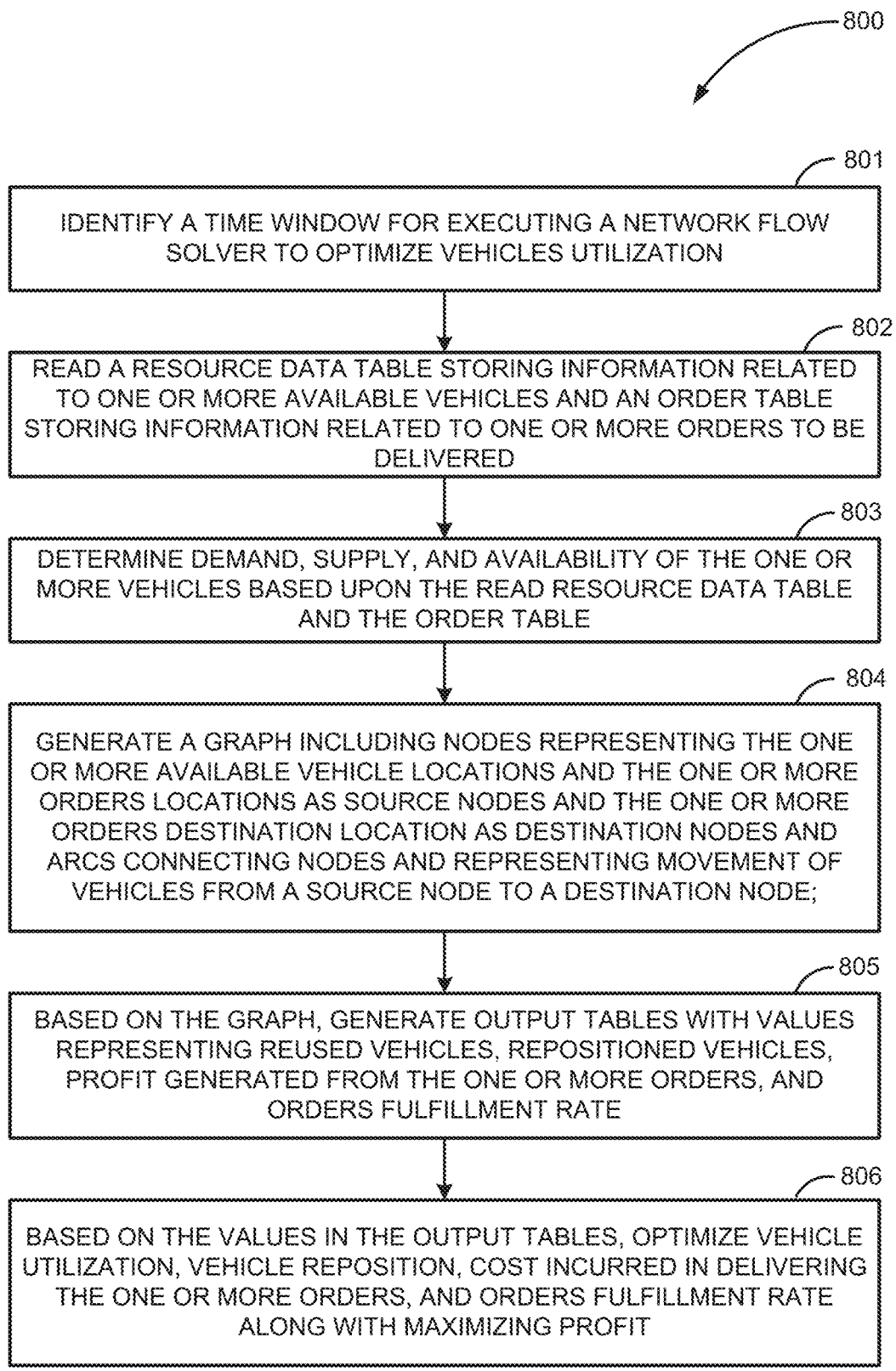
FIG. 8 is a flowchart illustrating a process of integrated system for optimizing vehicle utilization, according to an embodiment.

FIG. 8 is a flowchart illustrating process 800 to optimize vehicle utilization, according to an embodiment. At 801, a time window for executing a network flow solver (NFS) to optimize vehicles utilization is identified. For the identified time window, the NFS is executed to optimize vehicle utilization. At 802, upon executing the NFS, a resource data table storing information related to one or more available vehicles and an order table storing information related to one or more orders to be delivered is read. At 803, based upon the read resource data table and the order table, demand, supply, and availability of the one or more vehicles is determined. At 804, a graph including nodes representing the one or more available vehicle locations and the one or more orders locations as source nodes and the one or more orders destination location as destination nodes is generated. The graph also includes arcs connecting nodes and representing movement of vehicles from a source node to a destination node. At 805, based on the graph, output tables with values representing reused vehicles, repositioned vehicles, profit generated from the one or more orders, and orders fulfillment rate is generated. At 806, based on the values in the output tables, vehicle utilization, vehicle reposition, cost incurred in delivering the one or more orders, and orders fulfillment rate is optimized. The optimization is done along with maximizing profit and minimizing the tolerable delay in delivering the one or more orders.

In an embodiment, during design time or planning phase, various scenarios (e.g., by defining priority and delay tolerance, etc.) may be created by the user (customer) to generate corresponding solutions using NFS. In an embodiment, the solutions may be compared and one solution may be selected. For example, the user can vary the priority and delay tolerance and can check the result or solution and then can select the most preferable scenario, i.e., most preferable priority setting and delay tolerance.

An exemplarily runtime performance data of the integrated system for optimizing vehicle utilization (e.g., the integrated system 100 of FIG. 1) is collected as below:

| NAME | DATA SET 1 | DATA SET 2 |
|---|---|---|
| Planning period | 30 days | 3 months |
| Total number of orders | 4111 | 11816 |
| Resource (e.g., railcars/vehicles) | 10847 | 10847 |
| Network connections | 939397 | 939397 |
| Compatibility rules | 7140 | 7140 |
| Variables | 5,022,836 | 13,802,789 |
| Constraints | 14,958 | 40,875 |
| Data preparation time | 25 seconds | ~2 mins |
| Solver computation time | 6 seconds | 42 seconds |
| Order fulfillment rate | 95.2037% | 92.417% |
| Vehicle reuse | 5897 | 10356 |

The data is gathered for two different data sets or scenarios (DATA SET 1 and DATA SET 2). The scenarios may differ in various aspects, e.g., they may have different variables or parameters and/or they may have different values for same parameters, etc. Planning period indicates the time period or time window for which the performance is determined, total number of orders represents the total number of orders or booking placed by the customers, resources represents total number of vehicles used during the planning period, network connections indicates the total number of network (arcs in the graph) traversed or used between stations during the planning period, compatibility rule indicates total number of compatibility rules used, variables indicates total number of parameters used in the dataset, and constraints indicate total number of constraints used in the dataset. Data preparation time represents time system took to read input data (e.g., data related to parameters or variables), solver computation time represents time taken by NFS to solve the network/graph to calculate or compute optimal utilization of vehicles along with maximizing net profit, order fulfillment rate represents total number of successfully delivered orders/total number of orders, and vehicle reuse represents the total number of vehicles reused in the planning period.

Embodiments enable to optimize vehicle utilization, i.e., to utilize right vehicle, at a right time, and right locations to fulfil customers' orders (demand) along with generating maximum profit. Embodiments aim at balancing the demand and supply (e.g., through empty vehicle repositioning), minimizing the cost incurred (e.g., the waiting costs at stations and repositioning costs) in delivering the order, along with maximizing the revenue generated from the orders. Order status and vehicle movement are tracked or monitored in real-time and then determination is made for repositioning of vehicles (e.g., empty vehicles) based upon repositioning cost and waiting cost at stations. Proper utilization of resources or vehicle (e.g., empty vehicles) enable to fulfill order on time which brings customers' satisfaction along with enhancing or maximizing the revenue generated from the orders. The use of the in-memory database (SAP® HANA) allows to handle and pre-process very large business dataset, which boosts the system to provide a faster and real-time service. Multiple resource related key performance indicators (KPIs) are monitored automatically, such as operational costs (transportation, storage, etc.), utilization of resources, and customer order fulfillment rate, etc. Monitoring KPIs enable to manage a balance between demand and supply in various locations while minimizing operational costs. Further, the unfulfilled orders list along with the reasons for unfulfilled orders (e.g., resources and orders wagon type non compatible, negative profit, booking date close so EVR not possible, etc.) is also displayed. Replacement or alternative wagon or vehicle is automatically determined or assigned and the user does not require to manually figure out the replacement. The user (e.g., the planner) is given flexibility to interact with the workflow and experiment on performance of the system. For example, the user can set strategies by configuring various parameters such as the delay rules, the wagon compatibility rules, different penalty, and priority of orders, e.g., to determine its impact on overall profit or performance. Based upon the impact (e.g., overall profit, utilization of vehicles, etc.) the user can adjust or change the strategy or parameters.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" includes a single medium or multiple media that stores one or more sets of instructions. The term "computer readable storage medium" includes physical article that is capable of undergoing a set of physical changes to physically store, encode, or otherwise carry a set of instructions for execution by a computer system which causes the computer system to perform the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic indicator devices: magneto-optical media: and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 9:
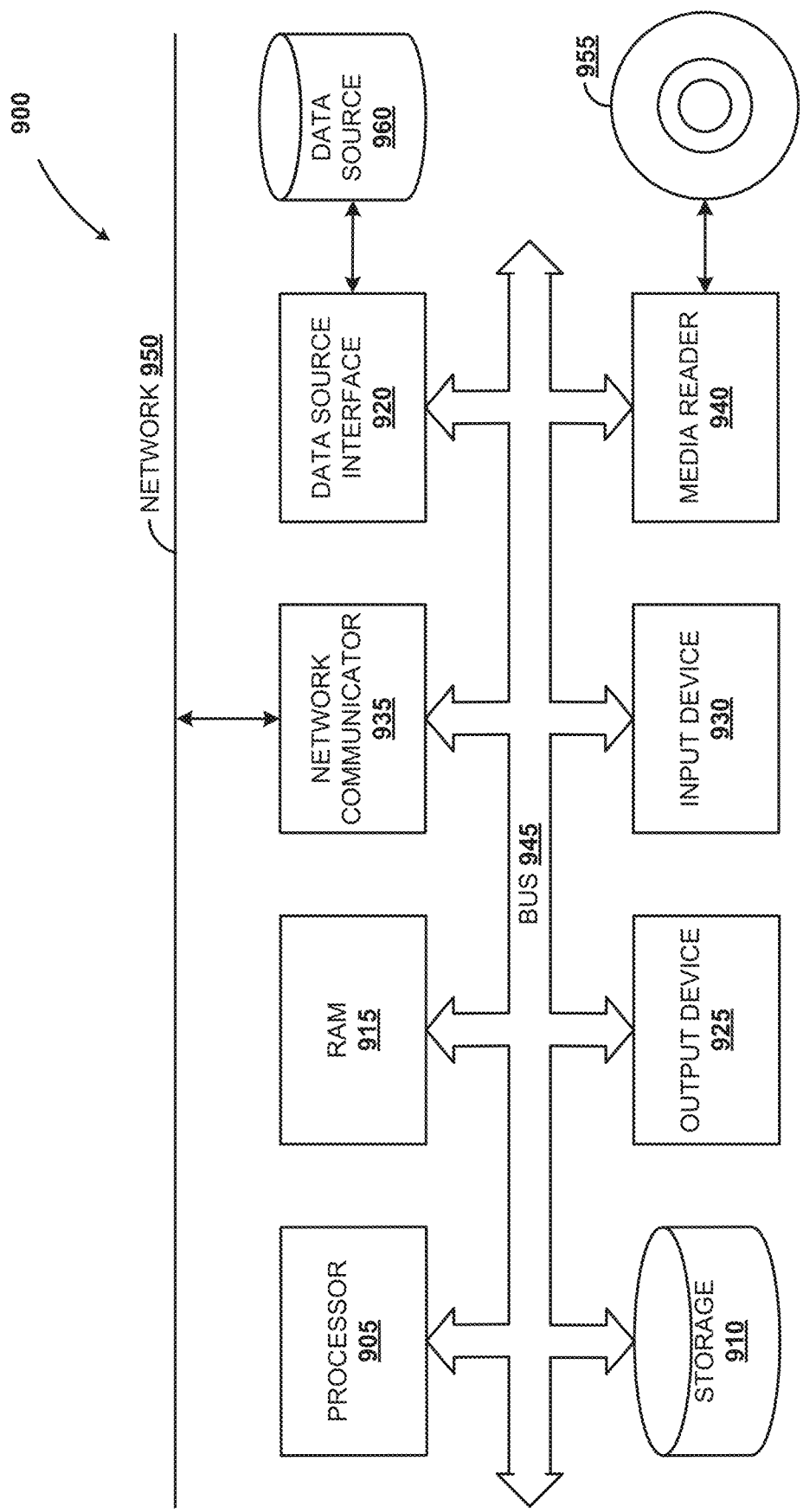
FIG. 9 is a block diagram illustrating an exemplary computer system, according to an embodiment.

FIG. 9 is a block diagram of an exemplary computer system 900. The computer system 900 includes a processor 905 that executes software instructions or code stored on a computer readable storage medium 955 to perform the above-illustrated methods. The processor 905 can include a plurality of cores. The computer system 900 includes a media reader 940 to read the instructions from the computer readable storage medium 955 and store the instructions in storage 910 or in random access memory (RAM) 915. The storage 910 provides a large space for keeping static data where at least some instructions could be stored for later execution. According to some embodiments, such as some in-memory computing system embodiments, the RAM 915 can have sufficient storage capacity to store much of the data required for processing in the RAM 915 instead of in the storage 910. In some embodiments, the data required for processing may be stored in the RAM 915. The stored instructions may be further compiled to generate other representations of the instructions and dynamically stored in the RAM 915. The processor 905 reads instructions from the RAM 915 and performs actions as instructed. According to one embodiment, the computer system 900 further includes an output device 925 (e.g., a display) to provide at least some of the results of the execution as output including, but not limited to, visual information to users and an input device 930 to provide a user or another device with means for entering data and/or otherwise interact with the computer system 900. The output devices 925 and input devices 930 could be joined by one or more additional peripherals to further expand the capabilities of the computer system 900. A network communicator 935 may be provided to connect the computer system 900 to a network 950 and in turn to other devices connected to the network 950 including other clients, servers, data stores, and interfaces, for instance. The modules of the computer system 900 are interconnected via a bus 945. Computer system 900 includes a data source interface 920 to access data source 960. The data source 960 can be accessed via one or more abstraction layers implemented in hardware or software. For example, the data source 960 may be accessed by network 950. In some embodiments the data source 960 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Database Connectivity (ODBC), produced by an underlying software system, e.g., an enterprise resource planning (ERP) system, and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the one or more embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the embodiment are described herein for illustrative purposes, various equivalent modifications are possible within the scope of the embodiments, as those skilled in the relevant art will recognize. These modifications can be made to the embodiments in light of the above detailed description. Rather, the scope of the one or more embodiments is to be determined by the following claims, which are to be interpreted in accordance with established doctrines of claim construction.

What is claimed is:

1. A non-transitory computer-readable medium to store instructions, which when executed by a computer, causes the computer to:
    identify a time window for executing a network flow solver (NFS) to assign one or more vehicles for one or more orders; and
    for the identified time window, execute the NFS to:
        read a resource data table storing information related to the one or more vehicles and an order table storing information related to the one or more orders;
        based upon the read resource data table and the order table, determine demand, supply, and availability of the one or more vehicles;
        generate a graph including:
            nodes representing locations of the one or more vehicles as source nodes and destination locations of the one or more orders as destination nodes; and
            arcs connecting the nodes and representing movement of vehicles from the source nodes to the destination nodes;
        based on the graph, generate output tables with values representing one or more reused vehicles, one or more repositioned vehicles, and an orders fulfillment rate;
        assign the one or more vehicles to the one or more orders based on the values in the output tables including assigning one or more arcs between respective nodes of the graph as associated with the one or more vehicles;

determine whether the orders fulfillment rate in a current iteration of the NFS equals the orders fulfillment rate in a last iteration of the NFS;

when the orders fulfillment rate in the current iteration does not equal the orders fulfillment rate in the last iteration, execute a next iteration of the NFS to increase the orders fulfillment rate in the next iteration to be greater than or equal to the orders fulfillment rate in the current iteration; and when the orders fulfillment rate in the current iteration equals the orders fulfillment rate in the last iteration, monitor order status and vehicle movement in real-time during delivery of the one or more orders.

2. The non-transitory computer-readable medium of claim 1, wherein arcs are generated based upon one or more validity conditions including:

whether there is connectivity from a source node of the source nodes to a destination node of the destination nodes;

whether a type of vehicle available at the source node is same or compatible with a type of vehicle required by an order to be delivered at the destination node; and whether a time period to travel from the source node to the destination node is less than or equals to a time available to deliver the order.

3. The non-transitory computer-readable medium of claim 1 further comprises instructions which when executed by the computer further causes the computer to assign an arc, corresponding to one of a plurality of arc types, in the graph, wherein the arc types includes:

loaded move arc indicating movement of a loaded vehicle between the nodes;

empty repositioning arc representing movement of an empty vehicle between the nodes; and waiting arc representing no movement of vehicle for a time period at a node.

4. The non-transitory computer-readable medium of claim 3, wherein a type of the arc between the nodes is assigned based upon at least one of waiting cost at locations, long stand cost at locations, order priority, revenue generated from an order, tolerable delay for the order, and reposition cost between locations.

5. The non-transitory computer-readable medium of claim 1 further comprises instructions which when executed by the computer further causes the computer to:

generate demand and supply values of vehicles corresponding to the nodes of the graph; and generate flow values for the arcs of the graph, wherein the flow values represent at least one of a minimum number of vehicles and a maximum number of vehicles to be moved on an arc and a cost incurred in moving a vehicle on the arc.

6. The non-transitory computer-readable medium of claim 5, wherein a positive demand and supply value corresponding to a node indicates that the node is a supply node with surplus number of vehicles and a negative demand and supply value indicates that the node is a demand node with deficit number of vehicles.

7. The non-transitory computer-readable medium of claim 1, wherein generating arcs further comprises:

parsing a schedule of a vehicle; and based on the parsed schedule of the vehicle, generating arcs connecting the nodes associated with the locations of the one or more vehicles.

8. The non-transitory computer-readable medium of claim 1, wherein locations of the one or more vehicles are one or more stations at closest proximity to a cargo outlet or store and the destination locations of the one or more orders are one or more stations at closest proximity to a location of a customer.

9. The non-transitory computer-readable medium of claim 1 further comprises instructions which when executed by the computer further causes the computer to minimize tolerable delay of the one or more orders based upon the values in the output tables.

10. The non-transitory computer-readable medium of claim 1, wherein a vehicle is one of an aircraft, a watercraft, a spacecraft, and a land craft including a railcar.

11. The non-transitory computer-readable medium of claim 1, wherein assigning the one or more vehicles includes:

optimizing utilization of the one or more vehicles, repositioning of the one or more vehicles, and the orders fulfillment rate, wherein the optimization is performed to:

minimize cost incurred in delivering the one or more orders including waiting costs at various locations; and maximize net revenue generated from delivering the one or more orders.

12. A computer-implemented method for assigning one or more vehicles for one or more orders, the method comprising:

identifying a time window for executing a network flow solver (NFS) to assign the one or more vehicles for the one or more orders; and for the identified time window, executing the NFS to:

read a resource data table storing information related to the one or more vehicles and an order table storing information related to the one or more orders;

based upon the read resource data table and the order table, determine demand, supply and availability of the one or more vehicles;

generate a graph including:

nodes representing locations of the one or more vehicles as source nodes and destination locations of the one or more orders as destination nodes; and arcs connecting the nodes and representing movement of vehicles from the source nodes to the destination nodes;

based on the graph, generate output tables with values representing one or more reused vehicles, one or more repositioned vehicles, and an orders fulfillment rate; and assign the one or more vehicles to the one or more orders based on the values in the output tables including assigning one or more arcs between respective nodes of the graph as associated with the one or more vehicles;

determine whether the orders fulfillment rate in a current iteration of the NFS equals the orders fulfillment rate in a last iteration of the NFS;

when the orders fulfillment rate in the current iteration does not equal the orders fulfillment rate in the last iteration, execute a next iteration of the NFS to increase the orders fulfillment rate in the next iteration to be greater than or equal to the orders fulfillment rate in the current iteration; and when the orders fulfillment rate in the current iteration equals the orders fulfillment rate in the last iteration, monitor order status and vehicle movement in real-time during delivery of the one or more orders.

13. The computer-implemented method of claim 12, wherein generating the arcs comprises:
- determining that there is connectivity from a source node of the source nodes to a destination node of the destination nodes;
- determining that a type of vehicle available at the source node is same or compatible with a type of vehicle required by an order to be delivered at the destination node; and
- determining that a time period to travel from the source node to the destination node is less than or equals to a time available to deliver the order.

14. The computer-implemented method of claim 12 further comprising:
- generating demand and supply values of vehicles corresponding to the nodes of the graph; and
- generating flow values for the arcs of the graph, wherein the flow values represent at least one of a minimum number of vehicles and a maximum number of vehicles to be moved on an arc and a cost incurred in moving a vehicle on the arc.

15. A computer system for assigning one or more vehicles for one or more orders, the computer system comprising:
- at least one memory to store executable instructions; and
- at least one processor communicatively coupled to the at least one memory, the at least one processor configured to execute the executable instructions to:
  - identify a time window for executing a network flow solver (NFS) to assign the one or more vehicles for the one or more orders; and
  - for the identified time window, execute the NFS to:
    - read a resource data table storing information related to the one or more vehicles and an order table storing information related to the one or more orders;
    - based upon the read resource data table and the order table, determine demand, supply, and availability of the one or more vehicles;
    - generate a graph including:
      - nodes representing locations of the one or more vehicles as source nodes and destination locations of the one or more orders as destination nodes; and
      - arcs connecting the nodes and representing movement of vehicles from the source nodes to the destination nodes;
    - based on the graph, generate output tables with values representing one or more reused vehicles, one or more repositioned vehicles, and an orders fulfillment rate; and
    - assign the one or more vehicles to the one or more orders based on the values in the output tables including assigning one or more arcs between respective nodes of the graph as associated with the one or more vehicles;
    - determine whether the orders fulfillment rate in a current iteration of the NFS equals the orders fulfillment rate in a last iteration of the NFS;
    - when the orders fulfillment rate in the current iteration does not equal the orders fulfillment rate in the last iteration, execute a next iteration of the NFS to increase the orders fulfillment rate in the next iteration to be greater than or equal to the orders fulfillment rate in the current iteration; and
    - when the orders fulfillment rate in the current iteration equals the orders fulfillment rate in the last iteration, monitor order status and vehicle movement in real-time during delivery of the one or more orders.

16. The computer system of claim 15, wherein the processor is further configured to execute the executable instructions to:
- generate arcs upon determining:
  - there is connectivity from a source node of the source nodes to a destination node of the destination nodes;
  - a type of vehicle available at the source node is same or compatible with a type of vehicle required by an order to be delivered at the destination node; and
  - a time period to travel from the source node to the destination node is less than or equals to a time available to deliver the order.

17. The computer system of claim 16, wherein generating the arcs further comprises:
- parsing a schedule of a vehicle; and
- based on the parsed schedule of the vehicle, generating arcs connecting the nodes associated with the locations of the one or more vehicles.

18. The computer system of claim 15, wherein the processor is further configured to execute the executable instructions to assign an arc, corresponding to one of a plurality of arc types, in the graph, wherein the arc types includes:
- loaded move arc indicating movement of a loaded vehicle between the nodes;
- empty repositioning arc representing movement of an empty vehicle between the nodes; and
- waiting arc representing no movement of vehicle for a time period at a node.

19. The computer system of claim 18, wherein the processor is further configured to execute the executable instructions to assign a type of the arc between the nodes based upon at least one of waiting cost at locations, long stand cost at locations, order priority, revenue generated from an order, tolerable delay for the order, and reposition cost between locations.

20. The computer system of claim 15, wherein the processor is further configured to execute the executable instructions to:
- generate demand and supply values of vehicles corresponding to the nodes of the graph; and
- generate flow values for the arcs of the graph, wherein the flow values represent at least one of a minimum number of vehicles and a maximum number of vehicles to be moved on an arc and a cost incurred in moving a vehicle on the arc, wherein a positive demand and supply value corresponding to a node indicates that the node is a supply node with surplus number of vehicles and a negative demand and supply value indicates that the node is a demand node with deficit number of vehicles.

* * * * *